(12) United States Patent
Matthies

(10) Patent No.: US 6,461,193 B1
(45) Date of Patent: Oct. 8, 2002

(54) DATA CARD CONNECTOR

(75) Inventor: Juergen Matthies, Witten (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/807,891

(22) PCT Filed: Oct. 19, 1999

(86) PCT No.: PCT/IB99/01766

§ 371 (c)(1),
(2), (4) Date: Jul. 11, 2001

(87) PCT Pub. No.: WO00/24132

PCT Pub. Date: Apr. 27, 2000

(30) Foreign Application Priority Data

Oct. 19, 1998 (GB) .............................................. 9822697

(51) Int. Cl.$^7$ .............................................. H01R 31/08
(52) U.S. Cl. ........................ 439/509; 439/326; 439/911
(58) Field of Search ................................ 439/326, 331, 439/489, 630, 911

(56) References Cited

U.S. PATENT DOCUMENTS

| | | | | | |
|---|---|---|---|---|---|
| 5,627,587 A | * | 5/1997 | Murata et al. | ............... | 348/207 |
| 5,805,219 A | * | 9/1998 | Ejima | ........................ | 348/375 |
| 6,062,889 A | * | 5/2000 | Hyland et al. | .............. | 439/536 |

\* cited by examiner

*Primary Examiner*—Khiem Nguyen
(74) *Attorney, Agent, or Firm*—Antonelli, Terry, Stout & Kraus, LLP

(57) ABSTRACT

A data card connector (43) is disclosed which comprises a housing defining an aperture for receiving a data card with contacts, electrical connectors (14) for engaging the data card contacts to couple the data card contacts to an electronic device, and a cover (12) moveable between an open position and a closed position. The data card connector further comprises an indicator (19,20) for indicating when the cover is in the closed position. When the cover is in this closed position, the contacts of the data card are connected to the electronic device and electric connection between the data card and the electronic device may be affects.

38 Claims, 8 Drawing Sheets

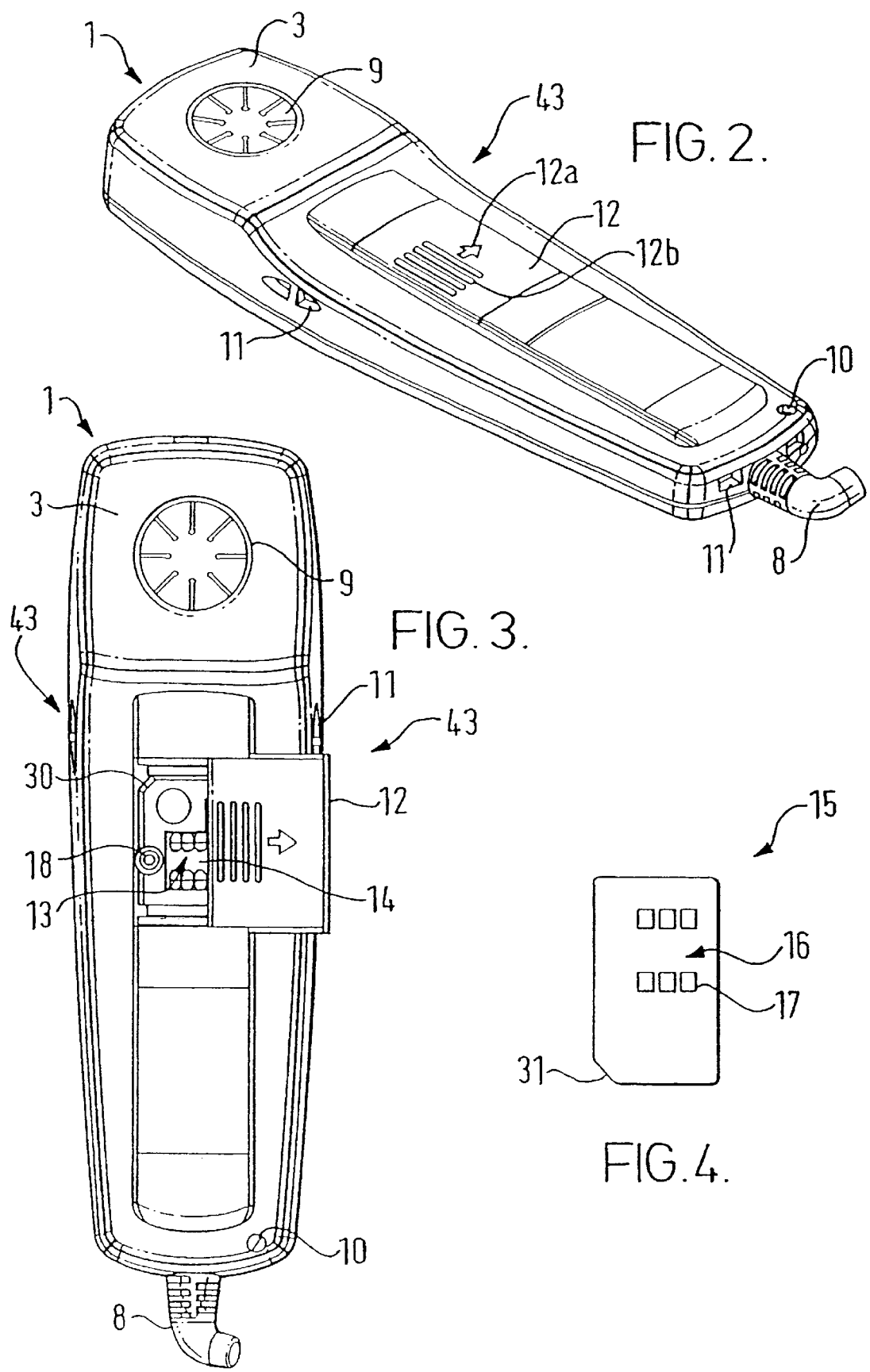

DATA CARD CONNECTOR

CROSS REFERENCE TO RELATED APPLICATION

This application is a 371 of PCT/IB99/01766, now abandoned.

BACKGROUND OF THE INVENTION

1. Field of the Invention

The present invention relates to a connector for a data card, in particular to a data card connector for transferring data between a communication device and a data card.

2. Description of the Prior Art

Data cards take various forms and those used, for example, in cellular phones, may include passive memory cards (i.e., especially a ROM) or an active processor card. An example of the latter is a smart card, which includes a memory as an integrated circuit, commonly referred to as a "chip", in which information is stored. The smart card may contain a subscriber identity module (SIM). Also, in addition to the subscriber identity information, such as a subscriber identifying telephone number, and personal identification number (PIN), the smart card may store for example, call charge information (i.e., a charge meter), a telephone number index, or false pin entries.

SIM cards are currently available in two sizes. The functionality of the SIM is the same for each, it is essentially that the physical dimensions are different. One is a credit card size SIM, and the other is a plug in SIM about 15 mm by 20 mm.

Other active processor cards include expansion cards which typically provide a communication device with additional functions, such as a modem function, or provide a driver for an external device.

Traditional data card holders are placed inside communication devices like mobile phones. Usually the battery pack powering the phone electronics has to be removed and the SIM card can be inserted by the user into a SIM card reader compartment which is closed by a cover or any other holding mechanism. After insertion of the card the battery pack is put in place and the users activates the power key of the phone. Now a microprocessor starts reading out information from the SIM card and asks the user for example for entering his PIN number if this application is activated. After the user has entered the correct PIN number the phone registers to the cellular network with the phone number read out from the SIM card and a phone calls can be established.

Other kinds of mobile phones, namely those phones which are mainly used in cars today and therefore now referred as to car phones, comprise usually a fixed unit installed at any convenient place in the car, e.g., in the boot and a handset comprising usually a keyboard and a display for operating the car phone and a loudspeaker and a microphone for communication.

The handset can for example be stored in a handset holder within the armrest besides the driver or at the dashboard of the car when it is not to be used. The car phone could be further equipped with devices for handsfree operation of the car phone and handsfree communication.

In early times the car phones usually provided a compartment for the SIM card in the fixed unit, but as this is fixed, e.g., installed in the boot of the car, it is inconvenient for the user to insert the card. As an alternative the SIM card compartment could be positioned inside the handset holder or within the handset itself. In the latter case usually a credit card sized SIM card is slidably engaged into the card holder of the handset.

However, because of the sliding movement of the card relative to the contacts of the card holder this way, there is a risk that the contacts, possibly even the contact pads on the card, may be damaged.

A variety of patent applications are published (e.g., GB 2 250 846) disclosing data card holders wherein the SIM card is inserted into a card receiving cover which is hingedly mounted on the main body of the communication device and on closing the cover the SIM card is pressed into the holder compartment and thereby the contacts of the SIM card are coupled to the contacts within the card holder.

U.S. Pat. No. 5,718,609 to Braun et al. describes a way in which a SIM card may be shielded during use. This is achieved by using a conductive SIM card holder, and electrically grounding the conductive holder.

Handheld mobile phones where the battery pack is usually removed before the SIM card can be inserted are powered off during this procedure. Car phones with a handset comprising a SIM card reader are not necessarily powered of as the car phone is connected to the car battery all the time. This could lead to an undefined condition of the car phone electronics, especially while the SIM card is slidably engaged to the card reader because not all contacts of the SIM card might be coupled to the SIM card reader contacts during insertion or, even worse, the SIM card contacts are coupled to the wrong SIM card reader contacts during insertion of the SIM card which may also damage the SIM card.

SUMMARY OF THE INVENTION

According to the invention there is provided a data card connector comprising: a housing defining an aperture for receiving a data card; and electrical connectors for coupling a data card and a cover movable between an open position and a closed position, wherein the data card connector further comprises an indicator for indicating whether the cover is in the open position or in the closed position.

By this indicator it is secured that the contacts between the data card and the data card connector are closed before any data contact from other electronics, e.g., electronics to read out the data card, is made to the data card before the cover is in the closed position. Furthermore the power supply for the data card can for example be turned on after it is indicated that the cover is in the closed position. Any damages to the data card because of unsecure electrical contact to the data card during the insertion of the data card is prohibited.

The indicator is preferably a switch. The switch can for example be in the closed position when the cover is closed or in the opened position when the cover is open.

Preferably the switch comprises electrical contact elements in the cover and the aperture for receiving the data card. When the cover is opened the contacts in the aperture and in the cover are not connected with each other and the switch is open. After the cover is closed the contacts have contact with each other and the switch is closed and indicated the cover closed position.

The construction of the switch preferably comprises a contact plate at the inner surface which is directed towards the aperture and the aperture comprises two contact springs directed towards the cover and when the cover is in the closed position the contact plate connects the contact springs for indicating the cover closed position.

Further the indicator indicates the cover position to a control unit and the control unit establishes a data connection to the electrical connectors upon cover-closed indication. This control unit could be a microprocessor that reads out a subscriber identifying telephone number and/or the personal identification number (PIN).

The data connection between the data card and the control unit is established when the data card is inserted and the cover-closed position is indicated.

Furthermore the control unit generates a data-card-missing signal after the data connection to the electrical connectors is established and no data card is inserted and the cover-closed position is indicated.

The cover of the data card is preferably slidably engageable with the housing to close off the aperture.

According to an embodiment of the invention the cover applies a force to the data card which presses the data card into the aperture and this way the data card contacts against the electrical connectors during the sliding engagement from the cover open to the cover closed position.

Preferably the cover comprises at least one guiding rail applying the force for pressing down the data card.

The longitudinal movement of the data card is limited by stops when the cover is sliding from the cover open position to the cover closed position and when the cover is in the closed position.

Preferably the data card contacts are coupled to the electrical connectors during the sliding engagement from the cover open to the closed position before the indication means indicate the cover closed position.

According to another aspect of the invention there is provided an interface for a communication device comprising a data card connector for the transfer of data between the card and the device.

According to a further aspect of the present invention there is provided a communication device comprising such an interface.

BRIEF DESCRIPTION OF THE DRAWINGS

Embodiments of the invention are shown by way of example in the accompanying drawings, of which:

FIG. 2 shows a back perspective view of the handset of FIG. 1 with the inventive data card connector with the cover in a closed position FIG. 3 shows the back view of the handset with the data card connector with the cover in the opened position FIG. 4 shows a plug-in SIM card

DESCRIPTION OF THE PREFERRED EMBODIMENTS

Figure 1:
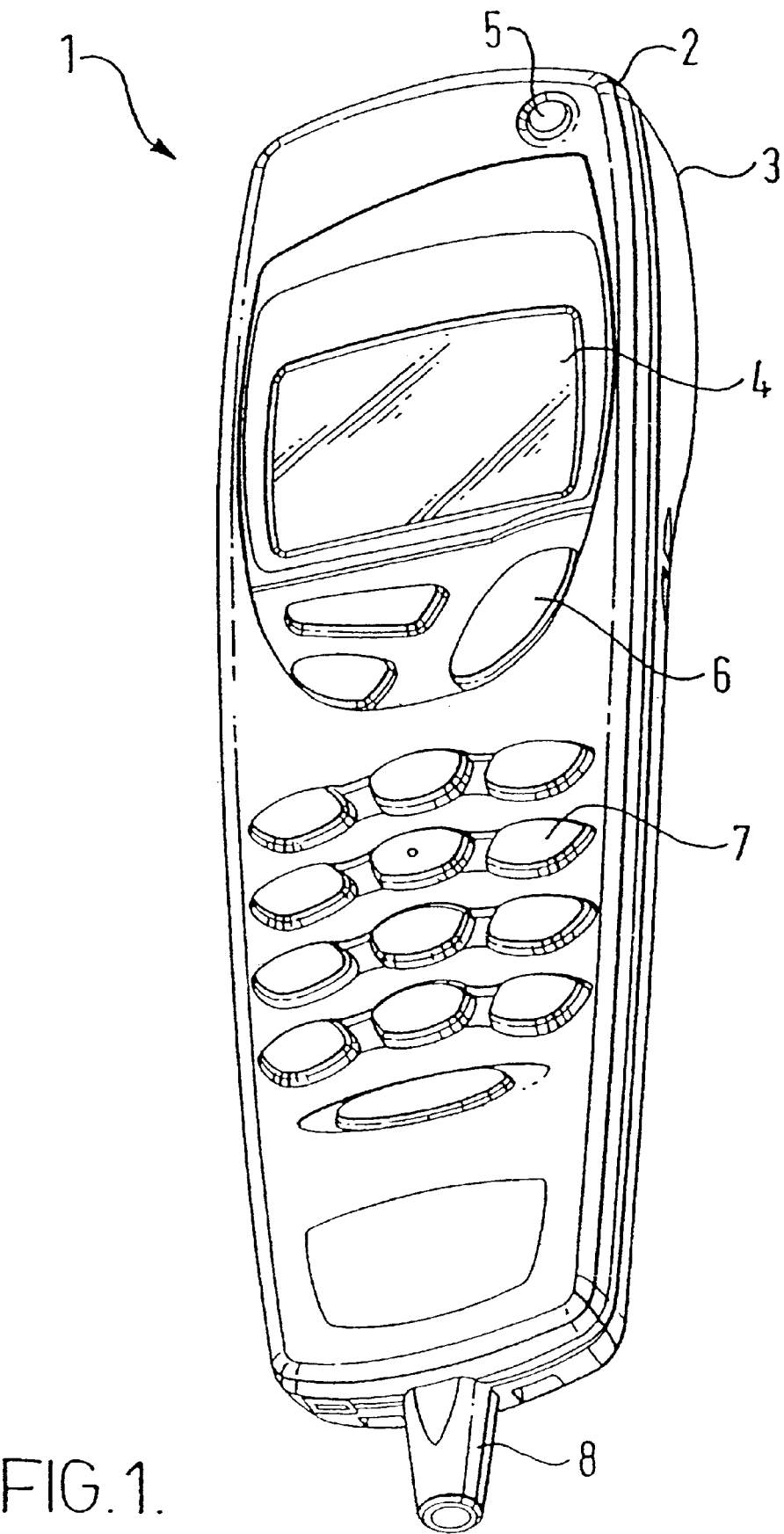
FIG. 1 shows a front perspective view of a handset belonging to a communication device comprising a data card connector according to an embodiment of the invention
Figure 8:
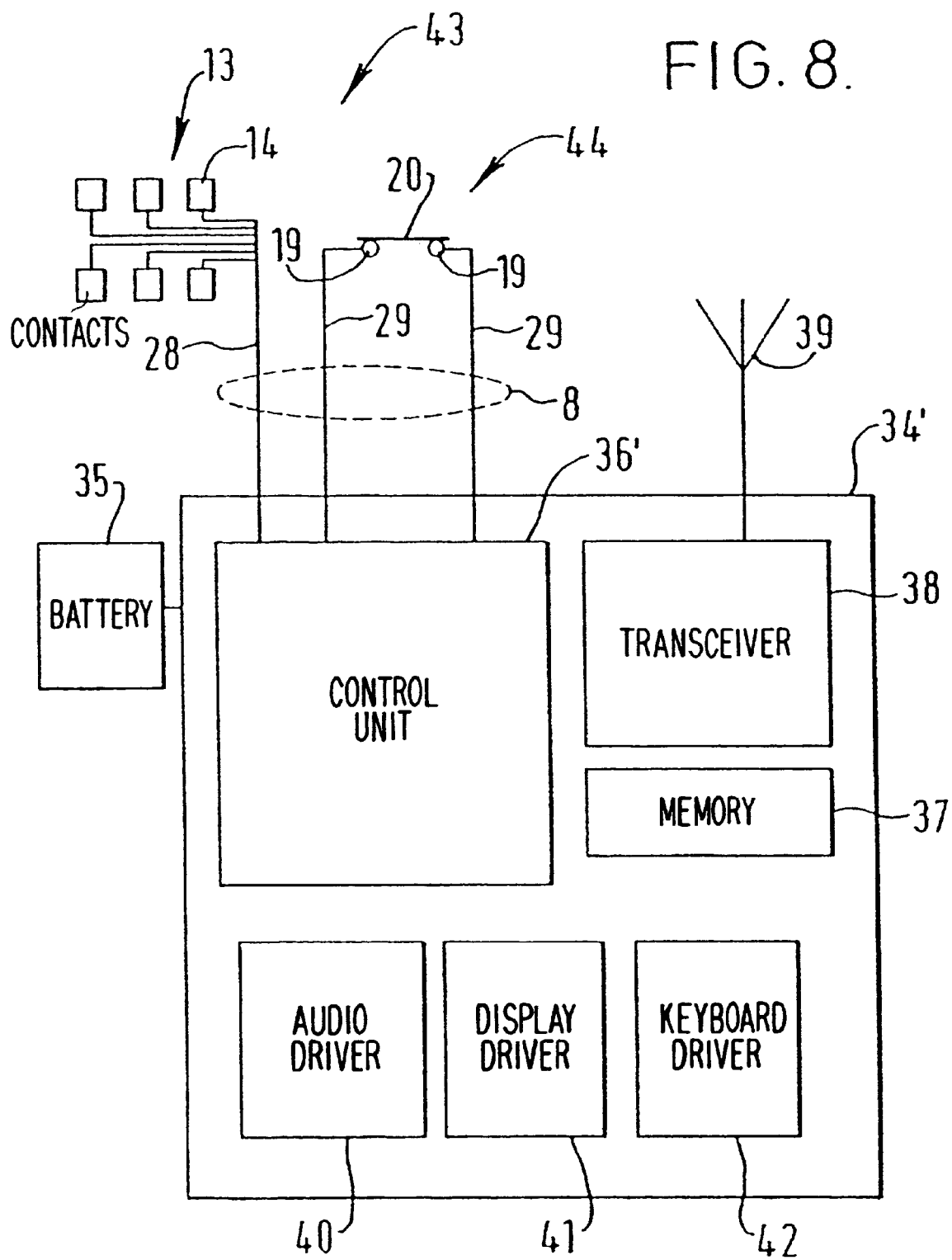
FIG. 8 shows a block diagram of the communication device with a schematic view of the data card connector according to the invention

FIG. 1 shows a handset 1 of a communication device, like a car telephone, with a front cover 2, a back cover 3, a display 4, on/off key 5, a field with three control keys 6 and a numerical keypad 7. The handset is connected to the other electronic parts of a mobile telephone such as is shown in FIG. 8.

The backside of the handset 1 of FIG. 1 is shown in FIG. 2 and FIG. 3, and in more detail in FIGS. 5a to 5e.

FIG. 2 shows the backside of the handset with the data card connector 43 in a closed position, i.e., the cover 12 of the data card connector 43 is closed. Furthermore openings 9 for a loudspeaker, an opening for a microphone 10 and notches 11 for holding the telephone in a holding mechanism are illustrated.

The cover 12 of the data card connector 43 is opened by sliding the cover 12 into the direction of the arrow 12a which is printed on the cover. The sliding is simplified for the user by the grip lines 12b on the cover 12. The handset 1 with the cover 12 in the closed position is shown in FIG. 2. Within the data card connector 43 a contact field 14 with six electrical contacts 13 and a hole 18 for connecting the front cover 2 and the back cover 3 with a screw is illustrated.

FIG. 4 illustrates a Plug-In SIM card 15 as it can be inserted into the aperture of the data card connector 43 of the handset 1. The SIM card 5 comprises a contact field 16 with six electrical contacts 17. Within the SIM card 15 a microprocessor unit and a memory is integrated which contains for example user identification information and phone book entries. The contents of the memory can be read out by the phone electronics when the SIM card 15 is inserted into the data card connector 43 of the handset. In order to take care that the user always puts the SIM card 15 into the data card connector 43 in the right orientation, the SIM card 15 comprises an edge 31 which fits with the edge 30 within the data card connector 43.

Figure 5A:
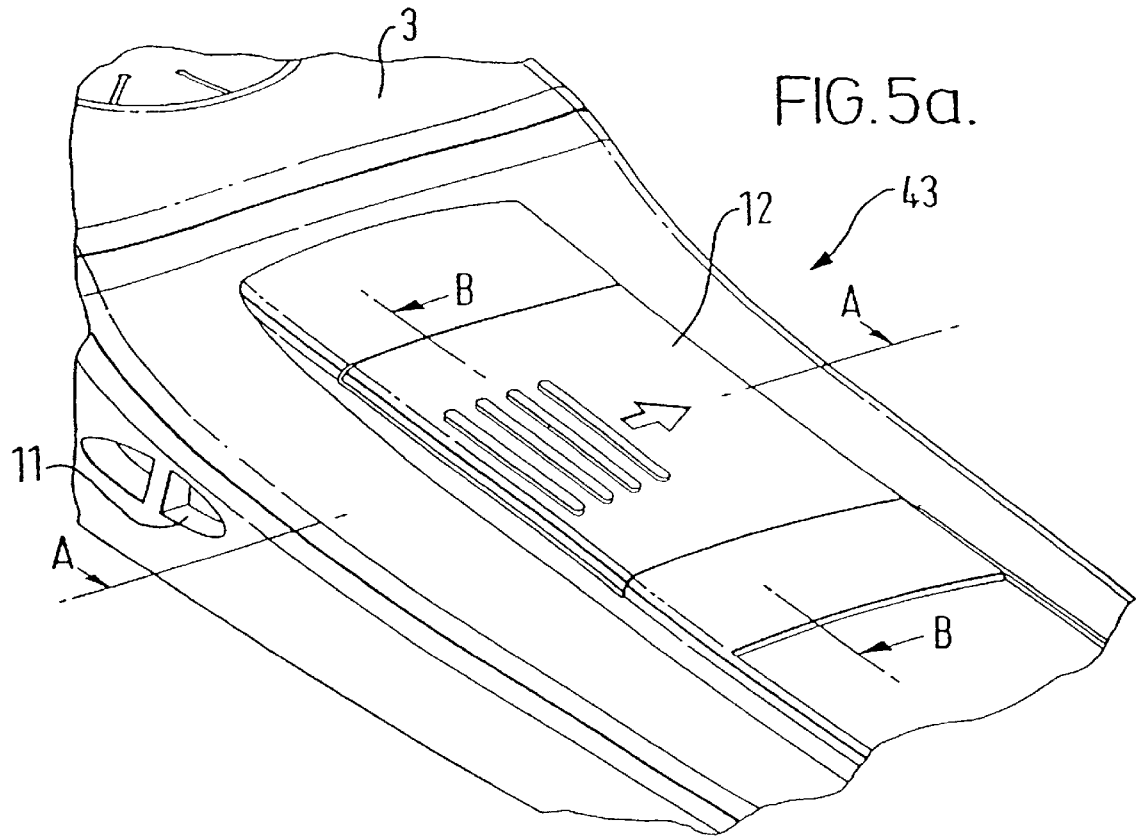
FIGS. 5a–5e show detailed and enlarged perspective views of the back of the handset with the cover of the data card connector in different positions

FIGS. 5a–5e show the backside of the handset 1 in an enlarged view compared to FIGS. 2 and 3. In FIG. 5a, the data card connector 43 cover 12 is in the closed position as in FIG. 2. The lines A—A and B—B refer to the section views of FIG. 6 (A—A) and FIG. 7 (B—B).

Figure 5B:
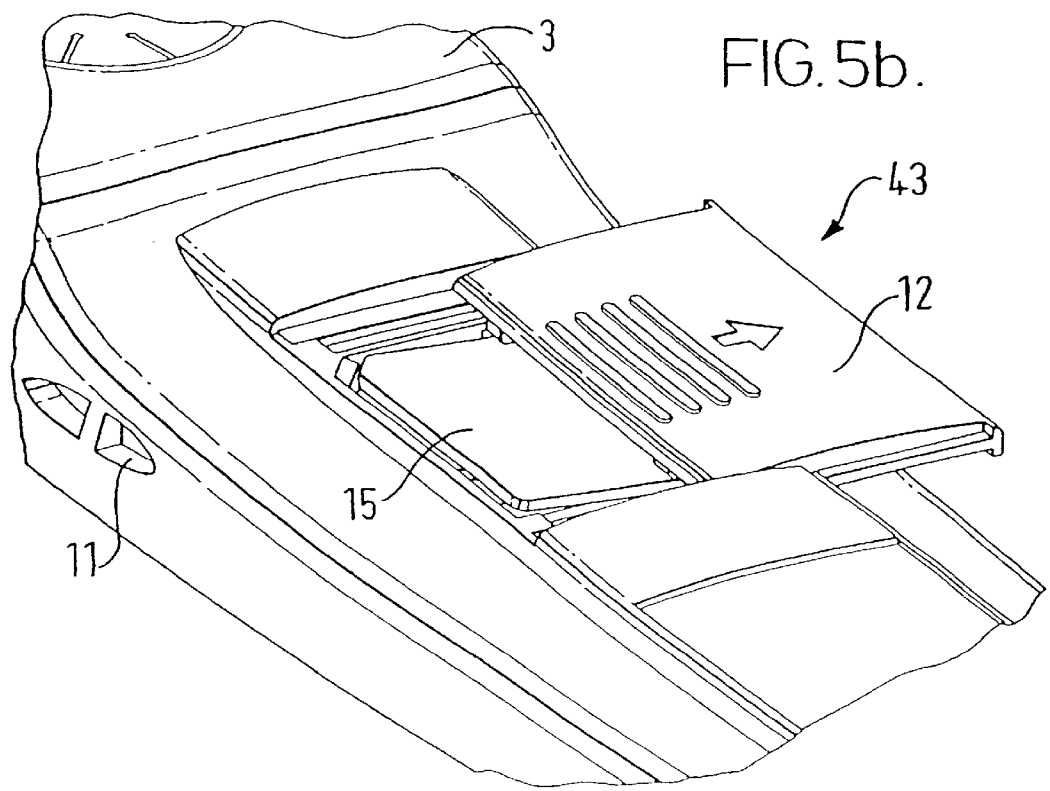
Figure 5C:
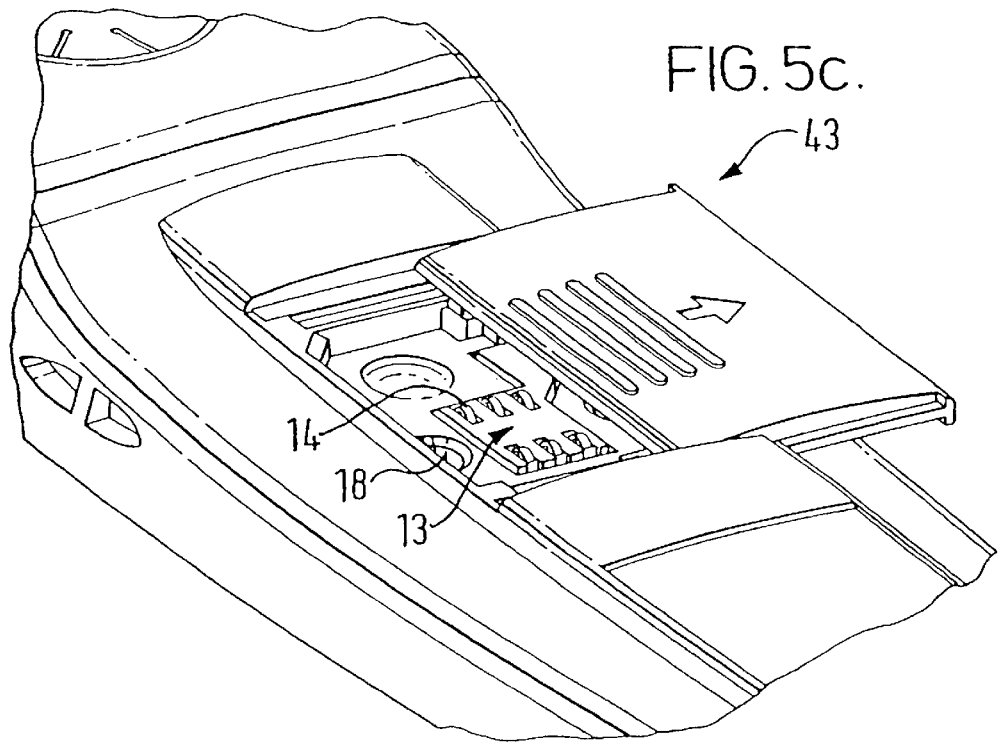

FIG. 5b shows the data card connector 43 in the opened position with an inserted SIM card 15. The SIM card is lifted up by the electrical contacts 13 by a few millimeters and can be easily removed by the user. A detailed perspective view of the opened data card connector 43 with the SIM card 15 removed is shown in FIG. 5c.

Figure 5D:
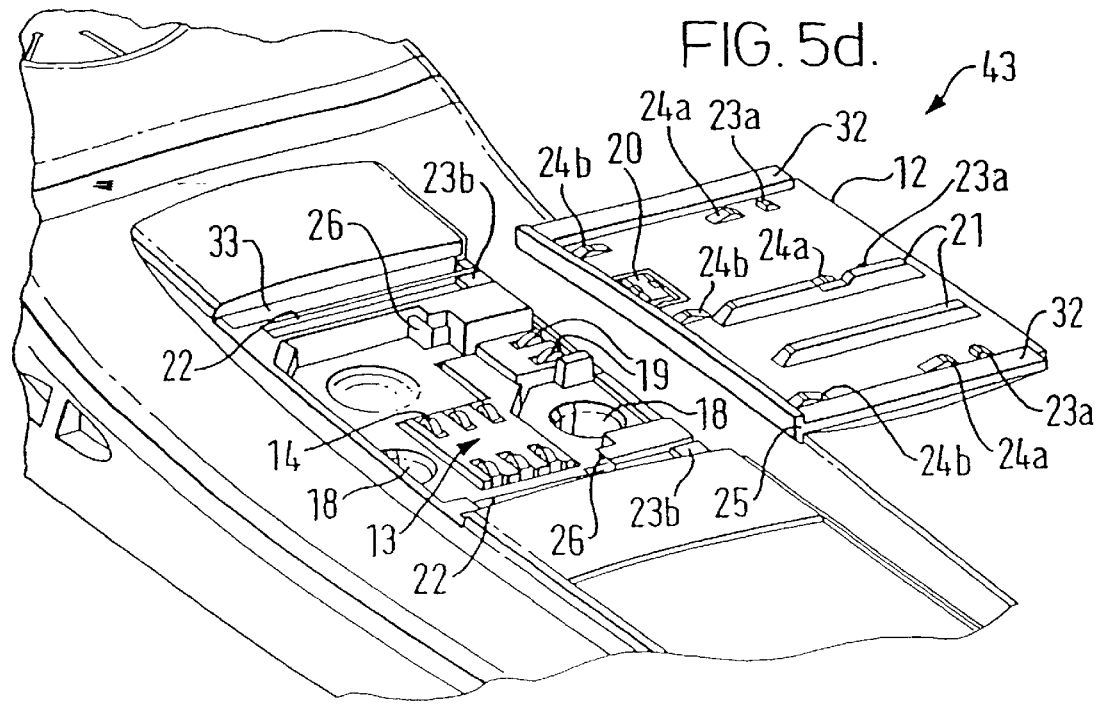

In FIG. 5d, the cover 12 of the data card connector 43 is removed from the handset 1 and the backside of the cover is shown. During normal operation the removal of the cover 12 is prevented by catches 23a and 23b. During normal operation, i.e., the cover 12 is slid between its opened and closed position, the catches 23a, 24a and 24b are shifted within the notches 22. In the cover-closed position the catches 24b keep the cover in the closed position in conjunction with notch 23b. When the cover is in the opened position, the notches 23a and 24b keep the cover in the opened position and avoid that the cover can be removed totally from the handset.

FIG. 5d further illustrates stops 26 for the SIM card 15. The stops 26 mark the right end position when the SIM card 15 is inserted.

When the cover is in the closed position, the stop 25 is pressed against the right side of the catches 23b. The cover comprises two leads 32 at its right and left end, which slide in the guides 33 of the back cover 3 of the handset 1.

Two guides 21, placed at the inner side of the cover 12 press down the plugin SIM Card 15 against the SIM card reader contacts 14 when a SIM card 15 is inserted and the cover 12 is in the closed position.

As it can be seen in FIG. 5c in connection with FIG. 5d and 5a, a switch, consisting of the two electrical contacts 19 and a metal plate 20 is below cover 12 when the cover 12 is in the closed position. When the cover 12 is in the open position, the metal plate 20 is not in contact with the two electrical contacts 19. When the cover is in the closed position, the metal plate 20 connects the electrical contacts 19 with each other and this way the switch is closed.

This function is better explained with reference to the drawings of FIGS. 6 and 7.

Figure 5E:
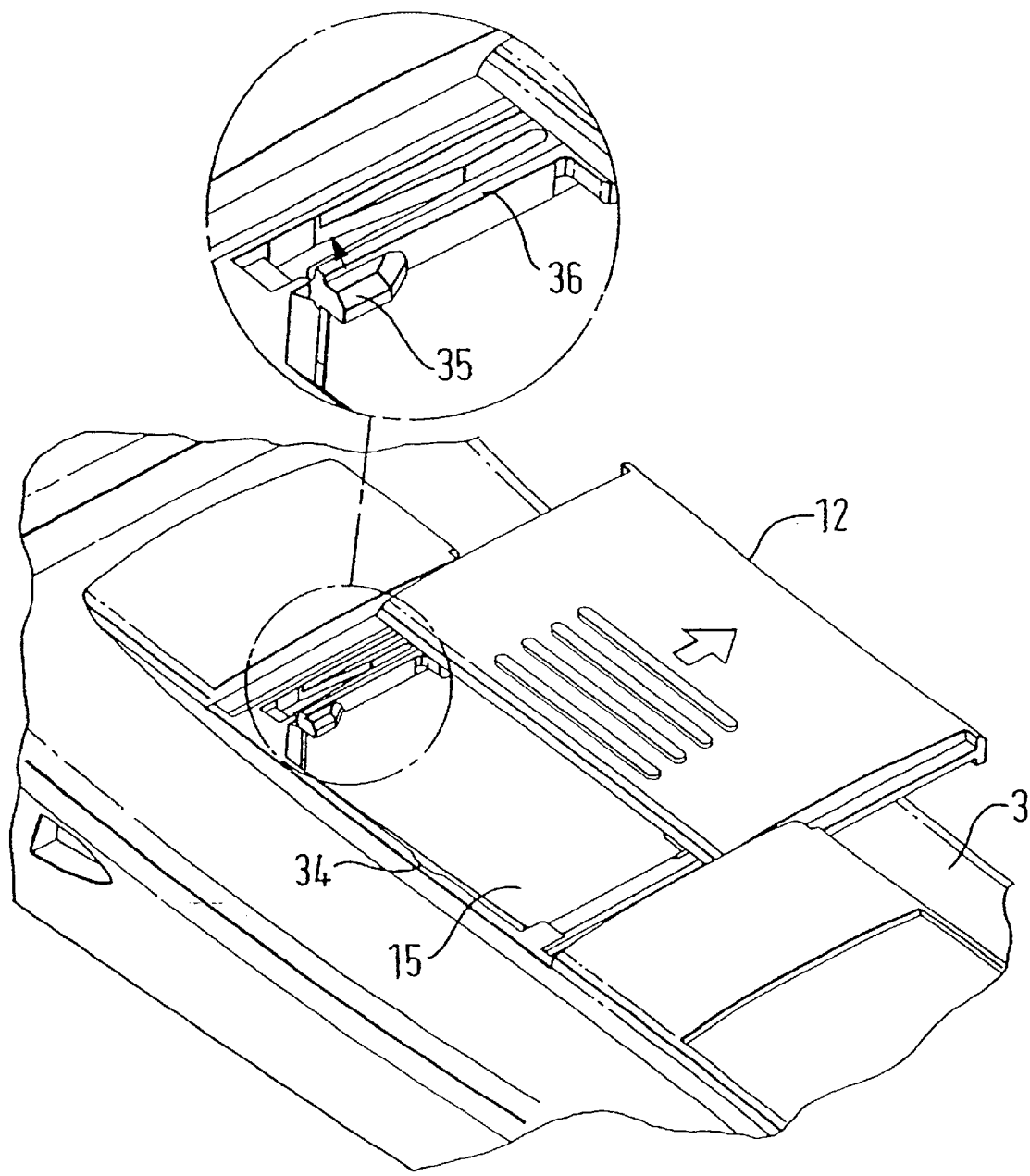

FIG. 5e presents a slightly different construction of the data card connector 43 as it is presented in FIG. 5b. In addition to the construction presented in the FIGS. 5a to 5d, the connector 43 comprises an elastic plastic part 36 with a projection 35 at the left end. The projection 35 presses down an inserted Plug-in S1M card when the cover 12 is in the opened position. The SIM card 15 can only be taken out from the connector 43 when the user shifts the elastic plastic part 36 together with the projection 35 into the direction of the arrow. This way the SIM card 15 is released and can be removed. After the SIM card is removed the elastic part 36 moves back into its initial state.

For inserting a SIM card 15, the card is simply pressed down and the projection 35 moves automatically into the direction of the arrow and gives the way free for the SIM card 15. When the SIM card 15 is in the final position the projection 35 keeps the card in this position.

The FIGS. 6a to 6d give a detailed overview about the function of the data card connector 43 during the insertion of a SIM card into the data card connector 43.

Figure 6A:
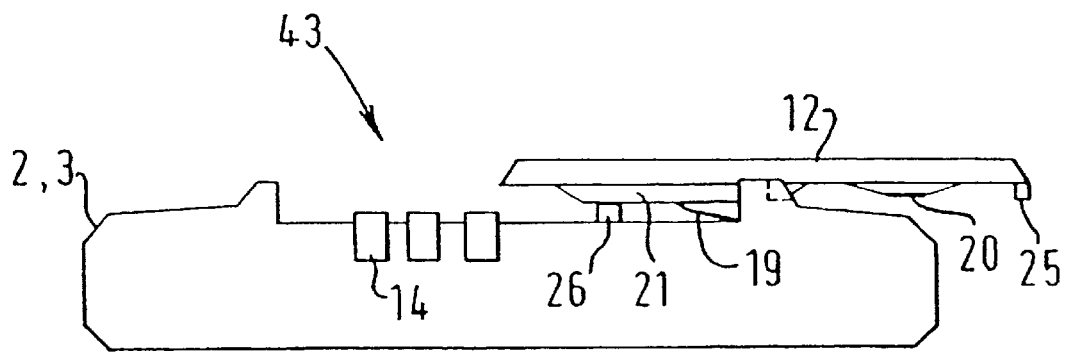
FIGS. 6a–6d show section views along line A—A of the handset with the cover in different positions

FIG. 6a shows a cross section view (A—A) of FIG. 5a of the handset 1. The cover 12 is in the open position and no SIM card is inserted into the data card connector 43.

Figure 6B:
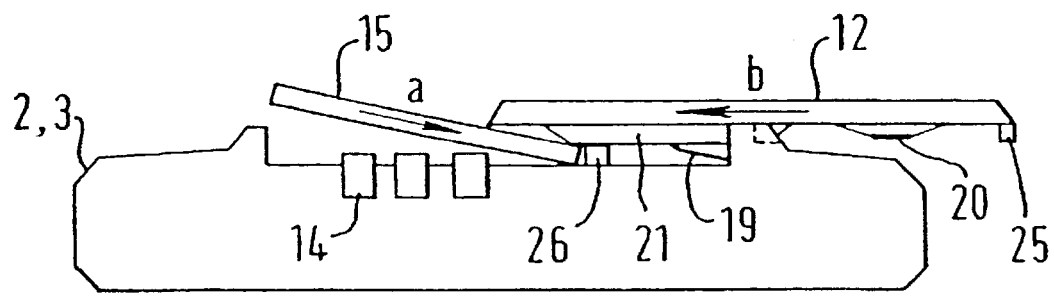
Figure 6C:
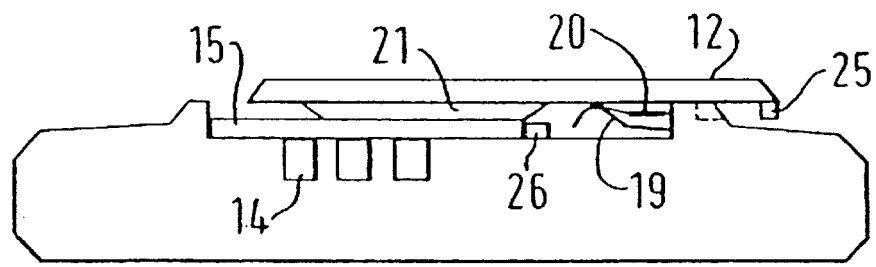

FIG. 6b shows the first step of the insertion of a SIM card 15. The user first presses the card with the right side against the stops 26 with a force in the direction of arrow (a). In the next step the user shifts the cover 12 into direction (b). This way the SIM card 15 is pressed down onto the SIM card reader contacts 14 by the guides 21 as shown in FIG. 6c. In FIG. 6c the cover 12 is half way closed and the SIM card 15 is pressed onto the contacts 14. The electrical contacts 19 are not connected with the metal plate 20 at this stage.

Figure 6D:
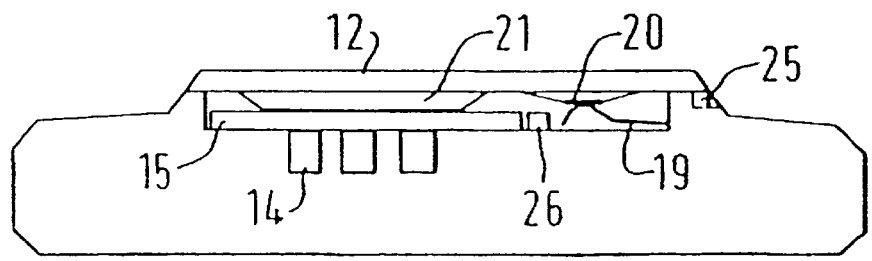

In FIG. 6d, the cover is in the closed position and the contacts 19 are connected with the metal plate 20, this way the switch comprising the contacts 19 and the metal plate 20 is closed. It is indicated that the cover is in the closed position and the SIM card 15 is in contact with the SIM card reader contacts 14. The stop 25 prevents that the cover 12 can be shifted further to the left by the user.

Figure 7A:
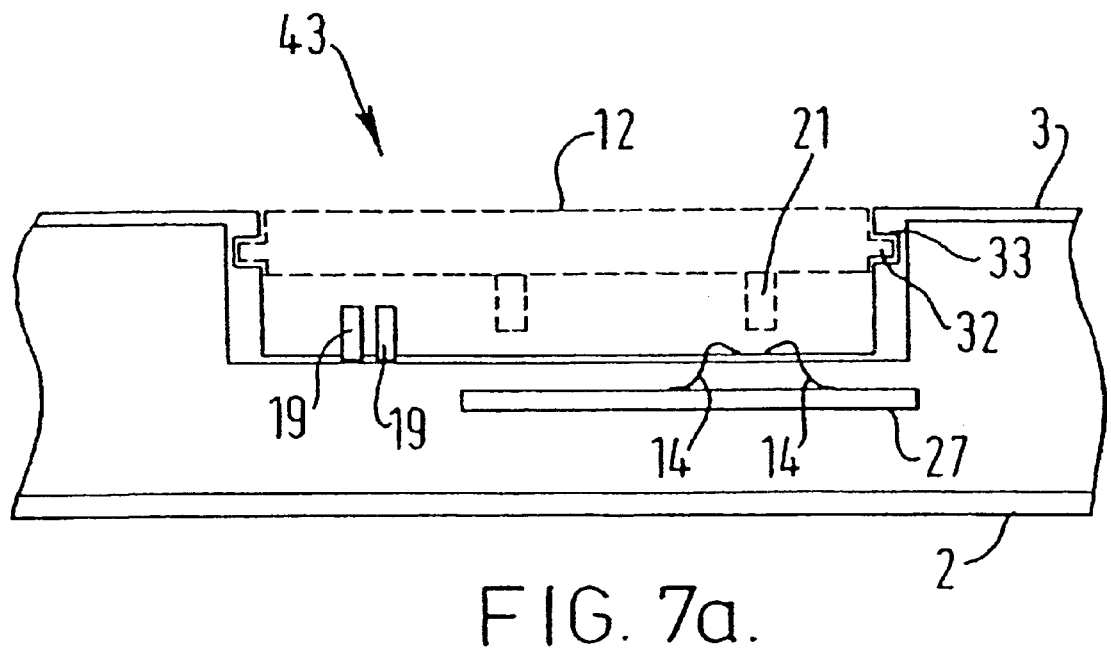
FIGS. 7a and 7b show section view along line B—B of the handset with the cover in an opened and in a closed position
Figure 7B:
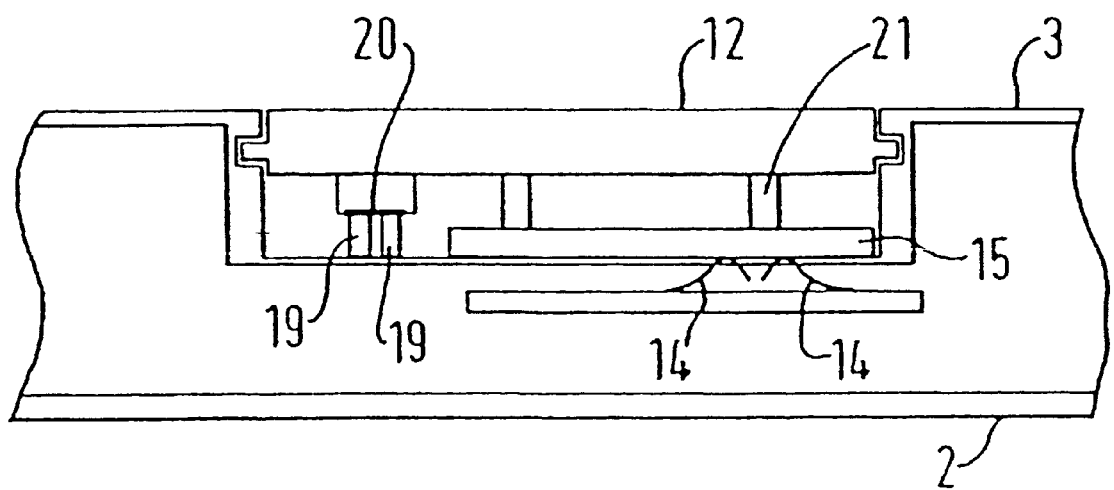

FIGS. 7a and 7b show a second section view (B—B) of the data card connector 43. In FIG. 7a, the data card connector 43 is in the opened position. The cover 12 with the guides 21 and leads 33, which is in the background at this stage, is drawn with dashed lines. In addition to FIG. 6a, printed circuit board 27 is shown where the SIM card reader contacts 14 are placed on.

In FIG. 7b, a SIM card 15 is inserted into the data card connector 43 and the cover 12 is in the closed position. The electrical contacts 14 are in contact with the contact fields 17 of the SIM card 15 and the electrical contacts 19 are connected through metal plate 20.

FIG. 8 finally shows the electrical function of the data card connector 43 working together with the phone electronics 34'. As shown in FIG. 1, the handset 1 is connected with the phone electronics by a connector 8. The phone electronics 34 basically comprise a control unit 36, which could be a microprocessor for example, connected with a memory 37, e.g., a RAM and/or ROM. To facilitate the radio frequency connection to a cellular telephone network, a radio frequency transceiver 38 is used together with an external antenna 39, which can be, placed somewhere outside the car when the phone is used in a car. A battery 35, e.g., the car battery, powers the electronics. The phone electronics 34 further comprise an audio driver 40, a display driver 41 and a keyboard driver 42 for exchanging signals with the handset 1 through connector 8. The connection to the handset 1 to the phone electronics is known to a person skilled in the art and therefore not further illustrated in FIG. 8.

The basic elements of the data card connector 43 illustrated in FIG. 8 are the SIM card contact field 13 comprising the SIM card contacts 14 and the switch 44 comprising the contacts 19 and the metal plate 20. The SIM card contact field 13 is connected to the control unit 36 by the data bus 28 and the switch 44 is connected to the control unit 36 by the lines 29. The data bus 28 and the lines 29 are part of the connector & between handset 1 and phone electronics 34 which is schematically illustrated with a dashed oval.

When the cover 12 of the data card connector 43 is closed the switch 44 is also closed and this state is indicated to the microprocessor 36. The microprocessor now starts to read out the SIM Card 15, which is now connected with the SIM contact field 13. For reading out the SIM card 15, it is necessary first to supply a voltage to the electrical contacts which is used for powering the electronic parts within the SIM card 15. This is done by the microprocessor after it has received the signal from switch 44 that the cover is closed.

When the cover 12 is closed but no SIM card 15 is inserted, the microprocessor also powers one of the SIM card reader contacts and tries to read out the SIM card contents but notices immediately that no card is inserted. At this stage the microprocessor might initiate a message to the user through display driver 41 and display 4 that a SIM card is missing and should be inserted into the handset before the communication device can be used.

This way it is also prevented that any of the SIM card contacts 14 is powered before the cover 12 is in the closed position irrespective if a SIM card is inserted or not. Therefore, any metal parts causing a short circuit between the SIM card contacts when the cover 12 is in the opened position can not damage the communication device. Furthermore the SIM card 15 can not be damaged electronically by any wrong insertion or during the closing procedure because the final electrical contact to the power supply and to the microprocessor is not established until the switch 44 is closed.

In view of the foregoing description, it would be evident to a person skilled in the art that various modifications may be made within the scope of the invention. For example, the data card connector could be a part of any other construction of a communication device, for example a handheld cellular mobile phone. Furthermore, the cover 12 of the data card connector 43 could be pivotally linked to the housing of the telephone.

What is claimed is:

1. A data card connector comprising:
    a housing including an aperture which receives a data card with contacts;
    electrical connectors within the aperture and which engage the data card contacts to couple the data card contacts to an electronic device;

a movable cover which moves from an open position to a closed position to cover the aperture; and an indicator which indicates when the cover is in the closed position and in response to the indicator indicating the cover is closed, the data card contacts are electrically connected to a source of electrical power and to the electronic device.

2. A data card connector as claimed in claim 1, wherein the indicator is a switch.

3. A data card connector as claimed in claim 2 wherein the switch comprises electrical contact elements in the cover and the aperture and the electrical contact elements contact when the cover is closed.

4. A data card connector as claimed in claim 1, comprising a controller for controlling the electrical connection in response to an output of the indicator.

5. A data card connector as claimed in claim 4, wherein the controller controls the connection of the source of electrical power to the data card and the electronic device when the indicator indicates the cover is closed.

6. A data card connector as claimed in claim 4, wherein the controller controls the transfer of data between the data card and the electronic device when the data card is present and the cover is closed.

7. A data card connector as claimed in claim 1 wherein the cover is slidably engageable with the housing to close off the aperture.

8. A data card connector according to claim 3 wherein the cover comprises a contact plate at an inner surface thereof which is directed towards the aperture and the aperture comprises two contact springs directed towards the cover and when the cover is in the closed position the contact plate connects the contact springs for indicating the cover closed position.

9. A data card connector as claimed in claim 7 wherein the cover applies a force to the data card to move the data card into the aperture such that the data card contacts contact the electrical connectors when the cover reaches the cover closed position.

10. A data card connector as claimed in claim 9 wherein the cover comprises at least one guiding rail applying the force for pressing the data card contacts towards the electrical connectors.

11. A data card connector as claimed in claim 9 comprising a stop for limiting longitudinal movement of the data card when the cover is sliding from the cover open position to the closed position and when the cover is in the closed position.

12. A data card connector as claimed in claim 9, wherein the data card contacts are coupled to the electrical connectors during sliding engagement from the cover open to the closed position before the indicator indicates the closed position.

13. An interface for a communication device comprising a data card connector as claimed in claim 1 for the transfer of data between the card and the device.

14. A communication device comprising an interface as claimed in claim 13.

15. A data card connector as claimed in claim 2, comprising a controller for controlling the electrical connection in response to an output of the indicator.

16. A data card connector as claimed in claim 3, comprising a controller for the controlling electrical connection in response to an output of the indicator.

17. A data card connector as claimed in claim 15, wherein the controller controls the connection of the source of electrical power to the data card and the electronic device when the indicator indicates the cover is closed.

18. A data card connector as claimed in claim 16, wherein the controller controls the connection of the source of electrical power to the data card and the electronic device when the indicator indicates the cover is closed.

19. A data card connector as claimed in claim 4, wherein the controller controls the connection of power to the data card when the indicator indicates the cover is closed.

20. A data card connector as claimed in claim 2 wherein the cover is slidably engageable with the housing to close off the aperture.

21. A data card connector as claimed in claim 3 wherein the cover is slidably engageable with the housing to close off the aperture.

22. A data card connector as claimed in claim 4 wherein the cover is slidably engageable with the housing to close off the aperture.

23. A data card connector as claimed in claim 5 wherein the cover is slidably engageable with the housing to close off the aperture.

24. A data card connector as claimed in claim 6 wherein the cover is slidably engageable with the housing to close off the aperture.

25. A data card connector as claimed in claim 15 wherein the cover is slidably engageable with the housing to close off the aperture.

26. A data card connector as claimed in claim 16 wherein the cover is slidably engageable with the housing to close off the aperture.

27. A data card connector as claimed in claim 17 wherein the cover is slidably engageable with the housing to close off the aperture.

28. A data card connector according to claim 3 wherein the cover comprises a contact plate at an inner surface thereof which is directed towards the aperture and the aperture comprises two contact springs directed towards the cover and when the cover is in the closed position the contact plate connects the contact springs for indicating the cover closed position.

29. A data card connector according to claim 4 wherein the cover comprises a contact plate at an inner surface thereof which is directed towards the aperture and the aperture comprises two contact springs directed towards the cover and when the cover is in the closed position the contact plate connects the contact springs for indicating the cover closed position.

30. A data card connector according to claim 5 wherein the cover comprises a contact plate at an inner surface thereof which is directed towards the aperture and the aperture comprises two contact springs directed towards the cover and when the cover is in the closed position the contact plate connects the contact springs for indicating the cover closed position.

31. A data card connector according to claim 6 wherein the cover comprises a contact plate at an inner surface thereof which is directed towards the aperture and the aperture comprises two contact springs directed towards the cover and when the cover is in the closed position the contact plate connects the contact springs for indicating the cover closed position.

32. A data card connector according to claim 7 wherein the cover comprises a contact plate at an inner surface thereof which is directed towards the aperture and the aperture comprises two contact springs directed towards the cover and when the cover is in the closed position the contact plate connects the contact springs for indicating the cover closed position.

33. A data card connector as claimed in claim 10 comprising a stop for limiting the longitudinal movement of the data card when the cover is sliding from the cover open position to the cover closed position and when the cover is in the closed position.

34. A data card connector as claimed in claim 10, wherein the data card contacts are coupled to the electrical connectors during the sliding engagement from the cover open to the closed position before the indication means indicate the cover closed position.

35. A data card connector as claimed in claim 10, wherein the data card contacts are coupled to the electrical connectors during the sliding engagement from the cover open to the closed position before the indication means indicate the cover closed position.

36. A data card connector comprising:

a source of electrical power;

a housing including an aperture which receives a data card with contacts;

electrical connectors within the aperture and which engage the data card contacts to electrically couple the data card contacts to a device;

a movable cover which moves from an open position at which the cover may be removed to a closed position to cover the aperture; and a sensor, associated with the removable cover and the aperture, which in response to the removable cover being in the closed position, controls a state of connection of the source of electrical power to the data card.

37. A data card connector in accordance with claim 36 wherein:

the state of connection completes a circuit in which current flows between the data card contacts and the device.

38. A data card connector in accordance with claim 36 wherein:

the sensor is a switch.

* * * * *